Sept. 17, 1968 HANS-JOACHIM HELD 3,402,299

METHOD AND APPARATUS FOR SCANNING

Filed June 18, 1965 3 Sheets-Sheet 1

INVENTOR
Hans-Joachim Held

BY Spencer & Kaye
ATTORNEYS

INVENTOR
Hans-Joachim Held

BY Spencer & Kaye
ATTORNEYS

INVENTOR
Hans-Joachim Held

BY Spencer & Kaye
ATTORNEYS

United States Patent Office 3,402,299

Patented Sept. 17, 1968

3,402,299

METHOD AND APPARATUS FOR SCANNING

Hans-Joachim Held, Litzelstetten, near Constance, Germany, assignor to Telefunken Patentverwertungsgesellschaft m.b.H., Ulm (Danube), Germany Filed June 18, 1965, Ser. No. 465,068

Claims priority, application Germany, June 18, 1964, T 26,396

20 Claims. (Cl. 250—219)

The present invention relates generally to the sorting art, and, more particularly, to a method and a device for carrying out the method of recognizing the position of flat articles with reference to a marker placed thereon, particularly with reference to the printed area on a check, and for producing signals in correspondence with the position of the flat article.

In the letter sorting art, it is already known to determine the position of a letter with reference to its stamp, by scanning the letter, while it is conveyed on edge, by means of several scanning devices on both sides of the conveying path. This scanning is done either only in proximity to its lower edge, or across its entire breadth. Each of the scanning devices, after determining that a stamp is present in its scanning region, guides the letter, under the assumption that the stamp is locaed on the front face in the upper right, to corresponding position-correcting devices. The letters can assume four positions with respect to their respective stamps and are all brought into identical positions by suitably rotating, turning or reversing the letters.

When processing flat articles such as, particularly, checks or vouchers, the conditions are different. Checks or vouchers do not carry position criteria, as letters do, for recognizing their position. Thus, other criteria are employed. For example, the position of the writing area can serve as such a criterion.

With this in mind, it is an object of the present invention to provide for the positioning of checks or markers.

Another object is to provide for using position markers on checks or vouchers as positional criteria.

A further object is to provide a method of and apparatus for, in a relatively simple manner, determining the position of checks or vouchers as they move along a conveying path.

These objects and others ancillary thereto are accomplished in accordance with preferred embodiments of the invention wherein position markers are provided on the checks or vouchers and the position of the flat articles is determined by means of scanning devices and evaluation circuitry.

In the method of the invention, one or several markers are provided on the flat articles, and always at the same distance from the reference edge, lying in the conveying direction, and from the opposite edge. The number of the markers at the two opposite edges are different from each other. Only the markers in proximity to the reference edge of the flat article are utilized for recognizing the position of the latter. The number of the markers and their spatial position when the article passes by a scanning device are employed as criteria for determining this position. The reference edge, in this connection, is the edge positioned in the conveying direction with reference to which the flat articles are aligned in the scanning device.

With flat articles which are provided with writing only on one side, the above-mentioned markers are provided, preferably on the side which has nothing printed thereon, i.e., on the rear face. Furthermore, the markers are preferably provided outside of the center-line which is at a right angle to the conveying direction, but always within the same half of the article.

Two markers may be provided in proximity to the reference edge of the flat articles, but only one marker is placed on the article in proximity to the opposite edge.

Additional objects and advantages of the present invention will become apparent upon consideration of the following description when taken in conjunction with the accompanying drawings in which.

Figure 1:
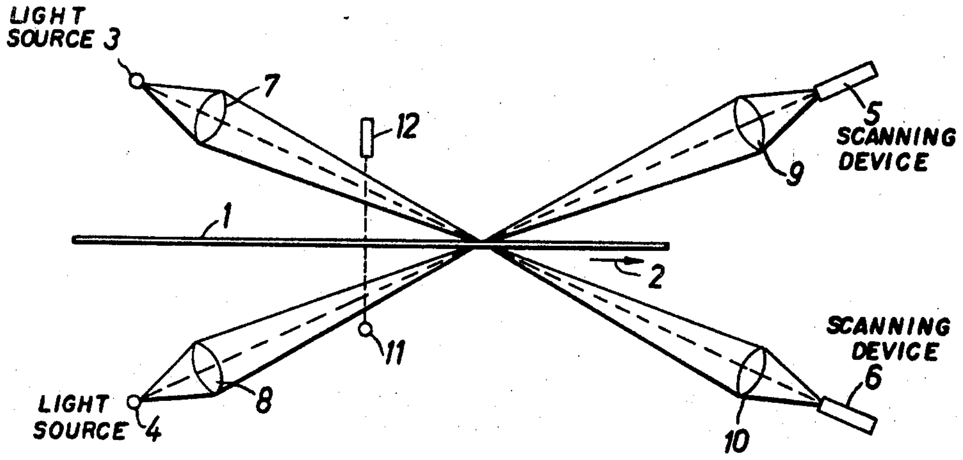
FIGURE 1 is a schematic plan view showing the arrangement of the scanning device at the conveying path of the flat articles.

With more particular reference to the drawings, FIGURE 1 shows a voucher 1 which passes on edge in the direction of arrow 2 through the scanning device from left to right. This scanning device, whose guide elements of the conveying path are omitted for the sake of clarity, contains two light sources 3 and 4 and two light-sensitive scanning elements 5, 6. One respective light source and scanning element are provided on each side of the conveying path. Each of the light sources has connected in front of it an optical system 7 and 8 respectively, which projects the light sources on the flat article 1. The light-sensitive scanning elements 5 and 6 which can each include, for example, one photodiode, are directed to the illuminated areas of the light sources 3 and 4 on the flat article. The markers can be of phosphorescent or fluorescent material and the spectral region of the scanning elements can be, at least partially, outside of the spectrum of visible light. For producing an accurately defined scanning area, the optical systems 9 and 10 are connected in front of the scanning elements.

Finally, there is a photoelectric sensor 11, 12, which provides a light barrier for controlling the conveying path. The spacing of this photoelectric sensor from the scanning region of the scanning elements is chosen such that the markers provided on the flat articles in each case have passed the scanning region at the time the rear end of the flat article passes the photoelectric sensor.

Although the embodiment of FIGURE 1 shows an on-edge manner of conveying the flat articles, it should be clear that such a device can also serve for conveying the articles on their broad sides or horizontally when correspondingly altered.

Figure 2:
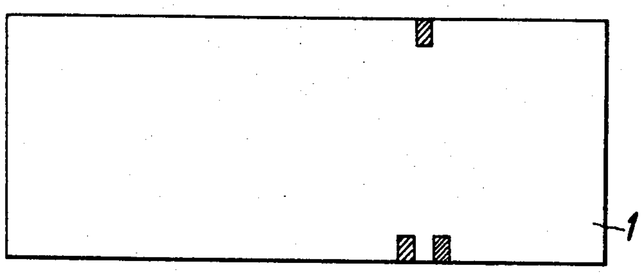
FIGURE 2 is an elevational view of the rear face of a check with the markings provided thereon.

In FIGURE 2, the rear face of a flat article, for example a check, is illustrated, which has provided thereon a total of three markers, namely two at the lower edge which at the same time represents the reference edge, and one on the upper edge.

Figure 3:
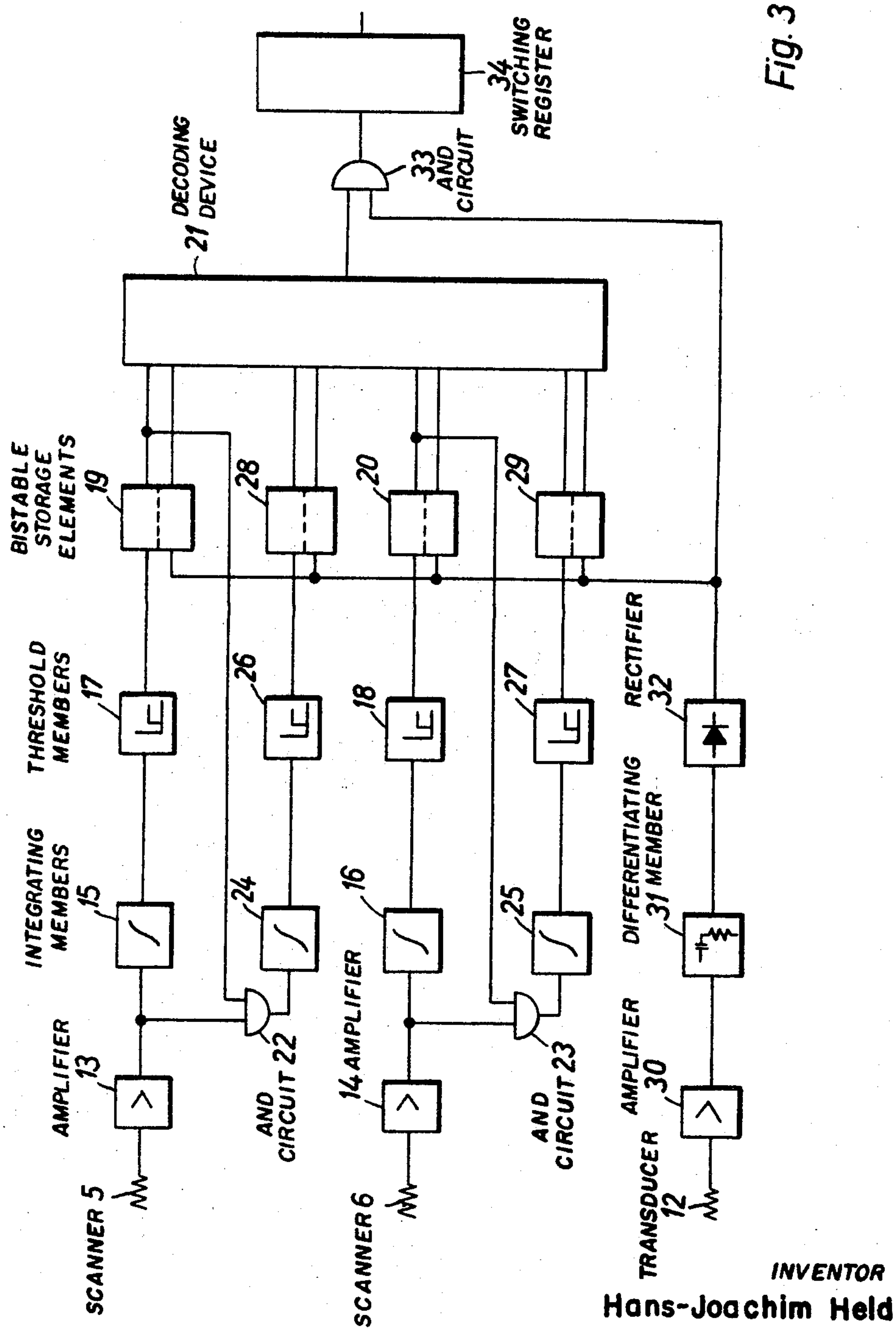
FIGURE 3 is a block diagram illustrating an evaluating circuit.

In FIGURE 3, there is shown the circuit diagram of the electronic evaluating circuit. Reference numerals 5 and 6 again designate the scanning elements, and 12 designates the sensing device of the photoelectric sensor. After the scanning elements—which give off a signal only when they identify a black area on the articles, i.e., in case the beam of light impinging on them is very small or disappears completely—amplifiers 13, 14 are connected. After this the integrating members 15, 16, and the threshold members 17, 18, are connected. The integrating members operate such that they produce a slowly increasing output signal as long as there is a signal at their input, but switch their output signal to zero after a very short time if their input signal disappears. Bistable storage elements 19, 20, are connected after the threshold members 17, 18. It is of no importance of which active structural elements these bistable storage elements are constructed.

One, or also both, outputs of these bistable elements 19, 20, are connected to a coding device 21. Such a coder is necessary in order to operate the device in accordance with the invention, but it is not necessary in every case. Its use can be avoided if the gate switches for the conveying paths into which the individual flat articles are to be distributed after passing through the scanning device can be controlled by those codings which are determined by the storage elements. One of the outputs of the storage elements 19, 20, is furthermore provided with one respective AND-circuit 22, 23, whose other input is connected to the respective outputs of the amplifiers 13. 14. Integrating members 24, 25, having the same characteristics as the integrating members 15, 16, are connected after the AND-members 22, 23. After the integrating members 24, 25, the threshold elements 26, 27, are connected, as well as the bistable storage elements 28 and 29. These four elements are constructed in the same manner as the corresponding elements 17 to 20. The outputs of the storage elements are also connected to the coding device 21.

The transducer 12 of the photoelectric sensor produces a signal only when a change from dark to light occurs. An amplifier 30, a differentiating member 31, and a rectifier 32 are connected after transducer 12. The output of this rectifier 32 and the output of the coding device 21 at the same time constitute the inputs of an AND-circuit 33 whose output is connected to a continuous switching register 34 in which the switching condition of all bistable storage elements 19, 20, 28, 29, is stored. Furthermore, the output of the rectifier 32 is also connected with all of the second inputs of the bistable storage elements 19, 20, 28, 29, for the purpose of re-setting them.

The above-described apparatus has the following mode of operation. It is assumed that there is no voucher in the device and that consequently light from the light sources 3 and 4 beams directly to the scanning devices 6 and 5. Thus, the latter do not emit a signal, and the storage elements 19, 20, 28 and 29 therefore are not set. If, now, a flat article enters the scanning arrangement, light from the light source 3 is now reflected to the scanning device 5, and light from the light source 4 is reflected to the scanning device 6. At the above-mentioned storage elements there is thus again no signal. The signal produced by disrupting the light barrier of the photoelectric sensor 11, 12, is suppressed in the circuit which includes amplifier 30, differentiating member 31 and rectifier 32 connected after the scanning device 12. If, now, for example, a marker is recognized on the flat article by the scanning device 5, a slowly increasing signal occurs at the output of the integrating member 15. At a certain value of potential, the threshold element 17 emits a signal and sets the bistable storage element 19. The condition of this storage element is fed into the coding device 21. If the scanning element 5 discovers still another marker, the AND-circuit 22 is opened and the integrating member 24 emits a slowly increasing output signal, the threshold value of the threshold element 26 is exceeded, and the storage element 28 is set.

If, in contradistinction thereto, the scanning element 6 had recognized markers on a flat article, the storage element 20 would have been set in the case of one marker, and the storage elements 20 and 29 would have been set in the case of two markers. From the switching condition of the four mentioned storage elements, a determination can be made in the coder 21 as to firstly, which of the two scanning elements 5 and 6 has recognized a marker and, secondly, how many markers this particular scanning element has recognized. Thus, there are provided four criteria at the coding device 21 for the four possible positions of the flat article with respect to its written area. Once the flat article has passed the light barrier of sensor 11, 12, the output signal which occurs is processed in the circuit 30, 31, 32 and is used for opening the AND-circuit 33 and to restore the bistable storage elements 19, 20, 28 and 29 to their original condition. As soon as the AND-circuit 33 is opened, the stored positional criteria of the flat article are transferred from the coding device 21 into the continuous switching register 34. From the latter, a corresponding control of the sorting process of the flat articles can be conducted in correspondence with the position of the articles.

It is possible, for example, to provide a total of four sorting compartments and to stack the flat articles corresponding to their position in one of these four compartments. However, it would also be possible to provide only one stacking compartment for the flat articles and to place these articles beforehand into one conformed position by suitable turning, rotating or reversing devices.

If transparent flat articles are used, it is also possible, in accordance with the present invention, to provide only one scanning element at the conveying path which recognizes the markers on both sides of an article.

Figure 4:
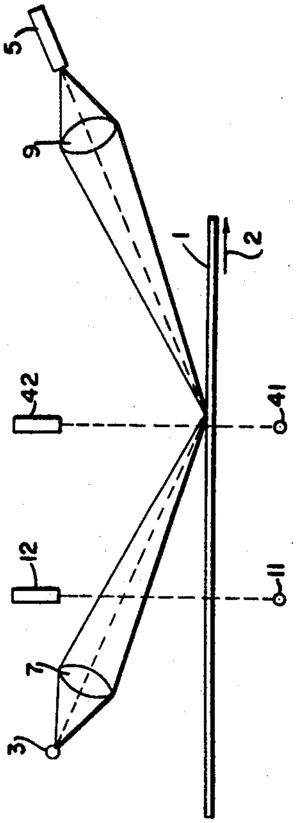
FIGURE 4 is a schematic plan view of another scanning arrangement.

Such a device is shown in FIGURE 4, wherein those elements which correspond to the elements of FIGURES 1 and 3 are provided with similar reference numerals. A voucher 1 passes through a scanning arrangement provided with a light source 3 as well as a corresponding optical system 7 and a scanning element 5 and its optical system 9. An additional light barrier has been provided by a photoelectric sensor including light source 41 and sensing element 42, which determines when the front edge of the voucher passes this point. The sensor arrangement determines when the front edge of the voucher passes and transmits a signal which allows a signal to be forwarded from the coding device 21 to the switching register 34.

Figure 5:
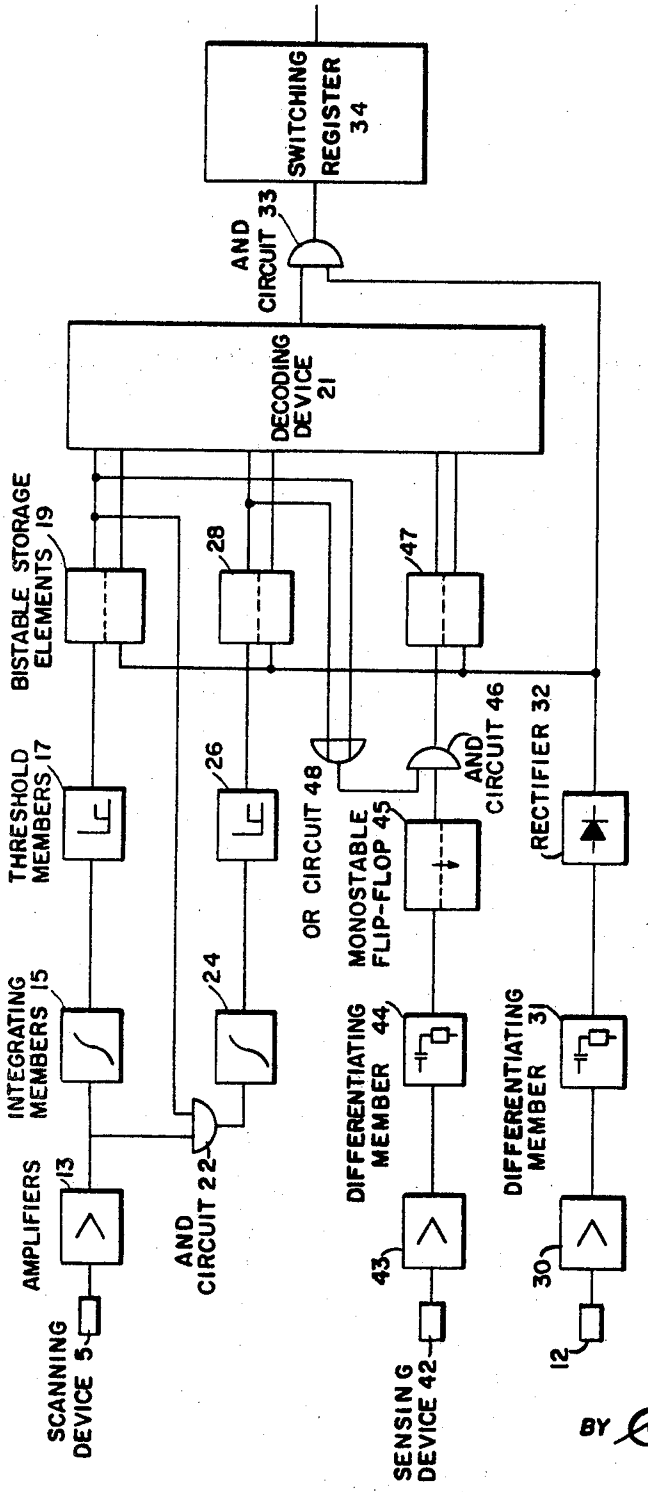
FIGURE 5 is a block diagram of a circuit for use with the arrangement of FIGURE 4.

With more particular reference to FIGURE 5, the circuit elements which are connected with the scanning element 5 and the sensing element 12 remain unchanged since they are the same as elements with similar reference numerals appearing in the circuit of FIGURE 3. However, an amplifier 43 and a differentiating member 44 are connected in series with the sensing element 42 of the light barrier arrangement. A monostable flip-flop circuit 45 is connected to the differentiating member 44 and the switching time of this flip-flop is half as long as the period of time which it takes for a voucher to pass through the scanning arrangement. An AND-circuit 46 is connected to the output of this flip-flop. The output of this AND-circuit is connected to a bistable storage element 47 which is constructed to be similar to the storage elements 19 and 28. Storage element 47 has its two outputs connected to the coding device 21. An OR-circuit 48 is provided having two inputs, one of which is connected to the output of a bistable storage element 19 and the other of which is connected to the output of bistable storage element 28. The ouput of this OR-circuit 48 is connected as an input to AND-circuit 46. The transducer 12 is connected to re-set the storage element 47 as well as storage elements 19 and 28.

In this embodiment of the invention the markers on the vouchers must not be applied between the front and rear edge as would be possible in the embodiments of FIGURES 1 and 3, but must be displaced from this middle portion (see FIGURE 2). When a voucher 1 enters the scanning arrangement in the direction of arrow 2 its front edge first interrupts the light barrier of sensor 41, 42 and the signal which is produced is amplified and differentiated and sets the monostable flip-flop 45. At the same time, the voucher is scanned by the scanning device including light source 3 and scanning element 5. If there are markings on the first half of the voucher, the storage element 19, and under certain circumstances also the storage element 28, is set. The output signals are applied to the AND-circuit 46 and allow the signal from the monostable flip-flop circuit 45 to be transmitted to set the storage element 47. The signals of the storage elements 19 and 47 and, if there are two markers on the voucher also that of storage element 28, now appear at the coding device 21.

If the markers are in the second half of the voucher, the monostable flip-flop will already have returned to its initial positon when the corresponding signals first occur at the storage elements 19 and 28. The conditions for causing an output signal at the AND-circuit 46 are not present and the storage element 47 will not be set. Thus, there is now only the signal of the storage element 19, and under certain circumstances that of the storage element 28, at the coder 21. When it appears from the sensing arrangement 11, 12, that the rear edge of the voucher is passing the light barrier of this sensing arrangement, the information contained in the coder 21 is transferred into the continuous switching register 34.

It can thus be seen that within the scope of the invention, markers can be, for example, either broad black lines or broad lines of fluorescing or phosphorescing material. These lines thus should have at least a certain minimum breadth because otherwise sufficient suppression of spurious signals could not be ensured. A favorable breadth for such lines has proven to be 4 to 5 mm.

In accordance with a first method of the invention, when using opaque flat articles, a scanning device is provided on each side of the conveying path. These scanning devices scan the lower portions of the flat article. The number of the scanned markers serve for recognizing the position of a flat article as does the particular one of the two scanning devices which recognized the markers.

A second method of the invention is used when sufficiently transparent flat articles are to be processed or when using opaque articles and transparent markers. In this event a scanning device is arranged only on one side of the conveying path. This device scans the lower portion of the flat article. The position of a flat article is recognized by the number of the scanned markers and by the instant of scanning, dependent upon a signal produced by the leading edge of the article when passing a predetermined point.

It will be understood that the above description of the present invention is susceptible to various modifications, changes and adaptations, and the same are intended to be comprehended within the meaning and range of equivalents of the appended claims.

What is claimed is:

1. A method for recognizing the position of flat articles being conveyed, with reference to a marker thereon, and particularly with reference to the outline of a written area on a check, comprising the steps of:

placing at least one marker on a flat article at a certain distance from its reference edge disposed in the conveying direction and at least one marker at the same distance from the opposite edge, there being different numbers of markers adjacent the two oppositely positioned edges;

scanning only the markers in proximity to one of said edges for recognizing the position of such flat article; and evaluating as criteria for this position the number and spatial position of such markers when the article passes a scanning zone.

2. A method as defined in claim 1 wherein the articles are provided with a written area on one side only, said markers being provided on the other side of the article.

3. A method as defined in claim 1 wherein the markers are provided outside of the area of a center line which is at right angles to the conveying direction and always in the same half of the article.

4. A method as defined in claim 1 wherein two markers are provided in proximity to the reference edge but only one marker is provided in proximity to the opposite edge of the articles.

5. A method as defined in claim 1 wherein broad black lines are provided on the article as markers and optical scanning is used.

6. A method as defined in claim 1 wherein the markers are broad lines of fluorescing or phosphorescing material, and optical scanning takes place, with the spectral region of optical scanning being disposed at least partially outside of the spectrum of visible light.

7. A method as defined in claim 1 wherein the flat articles are opaque, and scanning is performed on each side of the conveying path for the articles and always on the lower portion of the article so that the position of a flat article can be known from the number of scanned markers and the side of the article on which the markers have been determined to be.

8. A method as defined in claim 1 wherein scanning takes place on only one side of the conveying path for the articles and at the lower portion of the articles, and further comprising the step of sensing the leading edge of the article and the step of evaluating includes recognizing the position of a flat article in accordance with the number of markers scanned and the instant of time during which scanning occurs.

9. A method for recognizing the position of flat articles being conveyed with reference to a marker thereon comprising the steps of:

placing at least one marker on each of a number of flat articles at a certain distance from their respective reference edges disposed in the conveying direction and placing at least one marker at the same distance from their opposite edges, there being different numbers of markers at the two oppositely positioned edges;

scanning, in a scanning zone, only the markers in proximity to one of said edges for recognizing the position of such flat article; and evaluating, as criteria for the position of such flat article, the number and spatial position of such markers when the article passes a scanning zone.

10. A device for recognizing, in accordance with markers thereon, the position of flat articles being conveyed, comprising, in combination:

(a) means defining a conveying path;

(b) an irradiating source and a scanning element sensitive to the spectral region of the source provided on each side of the conveying path;

(c) light barrier means for monitoring the passage of an article along said path;

(d) circuit means connected to said scanning elements and said light barrier means and including (1) integrating means for eliminating spurious pulses, (2) threshold means connected to the integrating means, (3) two storage elements connected with each other for each scanning element such that a signal is provided from one of the elements if only one marker is scanned and a signal is provided at the other if two markers are scanned, said storage elements being connected to be reset by said light barrier means, (4) a register for evaluating position criteria, and (5) an AND-circuit connected to be opened by said light barrier means for transmitting signals at the outputs of the four storage elements to said register.

11. A device for recognizing, in accordance with markers thereon, the position of flat articles being conveyed, comprising, in combination:

(a) means defining a conveying path;

(b) irradiating means on one side of said path for irradiating articles moving along said path;

(c) scanning means on one side of said path and sensitive to the spectral region of the irradiating means for being activated when radiation is prevented from arriving at the scanning means due to markers on such articles;

(d) light barrier means for monitoring the passage of an article along said path;

(e) circuit means connected to said scanning means and said light barrier means and including (1) two storage element means connected with each other for said scanning element means for providing a signal from one of the element means if only one marker is scanned, and for providing a signal at the other if two markers are scanned, said storage element means being connected to be reset by said light barrier means, (2) a register for evaluating position criteria, and (3) a register AND-circuit connected to be opened by said light barrier means for transmitting signals at the outputs of the storage element means to said register.

12. A device as defined in claim 11 wherein said circuit means includes an amplifier connected to said scanning means, an amplifier AND-circuit connected to said amplifier, an integrating member connected to said amplifier in parallel with said amplifier AND-circuit, a threshold member connected after said integrating member.

13. A device as defined in claim 12 wherein said storage element means are bistable circuits each having two inputs and two outputs, one of said storage element means having its one input connected after the threshold member, said storage element means each having its second respective input connected to said light barrier means, the two outputs of each storage element means being connected as inputs to said register AND-circuit, and one of said outputs also being connected as an input to said amplifier AND-circuit.

14. A device as defined in claim 13 wherein said circuit means includes an integrating member connected after said amplifier AND-circuit, a threshold member connected after said last-mentioned integrating member, and a further bistable storage element means connected after said last-mentioned threshold member, the second input of the further storage element means being connected to said light barrier means and having two outputs connected to said register AND-circuit.

15. A device as defined in claim 13 wherein there is one irradiating means and one scanning means on one side of said path for scanning one side of articles moving therealong and another irradiating means and another scanning means on the other side of said path for scanning the other side of articles moving therealong.

16. A device as defined in claim 11 wherein there is one irradiating means and one scanning means on one side of said path for scanning one side of articles moving therealong and another irradiating means and another scanning means on the other side of said path for scanning the other side of articles moving therealong, and the irradiating means and scanning means are symmetrically arranged so that when there is no article in the conveying path one irradiating means beams into the scanning means on the other side of the conveying path and when an article is present in the conveying path the irradiating means beams into the scanning means on the same side of the conveying path because of reflection from the surface of the article.

17. A device as defined in claim 16 wherein said irradiating means are light sources.

18. A device as defined in claim 11 wherein said light barrier means includes a light source and a sensing element, and said circuit means includes an amplifier connected after said sensing element, a differentiating member connected after said amplifier, and a rectifier connected after said differentiating member, only said rectifier output being connected for resetting the storage element means and for actuating said AND-circuit.

19. A device as defined in claim 14, wherein said light barrier means includes a first section for sensing the leading edge of an article and a second section for sensing the trailing edge of an article.

20. A device as defined in claim 19 wherein said circuit means includes a monostable flip-flop having a switch-over time which is about one half the time an article is being scanned and connected to said first section, an AND-circuit having one input connected to the output of said flip-flop, an OR-circuit connected to the outputs of said storage element means and whose output is connected as the other input to said AND-circuit, a further bistable element means connected to the output of said AND-circuit, said light barrier means being connected so that only said second section resets all of said storage element means.

References Cited

UNITED STATES PATENTS

| | | | |
|---|---|---|---|
| 2,224,646 | 12/1940 | Friedman et al. | 209—111.7 |
| 2,894,626 | 7/1959 | Mulders et al. | 209—111.7 |
| 3,015,389 | 1/1962 | Levy | 209—111.7 |

RALPH G. NILSON, *Primary Examiner.*

R. F. HOSSFELD, *Assistant Examiner.*